United States Patent [19]

Lynch

[11] Patent Number: 5,271,467
[45] Date of Patent: Dec. 21, 1993

[54] METHODS AND SYSTEMS FOR RECOVERING SUBSURFACE MATERIALS

[75] Inventor: R. Larry Lynch, Seattle, Wash.
[73] Assignee: Univar Corporation, Kirkland, Wash.
[21] Appl. No.: 863,698
[22] Filed: Apr. 2, 1992
[51] Int. Cl.[5] .......................... E21B 43/00; F04B 49/06
[52] U.S. Cl. ...................................... 166/370; 166/53; 166/250; 166/68.5; 166/105
[58] Field of Search ................. 166/370, 53, 54.1, 68, 166/105, 68.5, 267, 250; 405/52, 258, 303

[56] References Cited

U.S. PATENT DOCUMENTS

| | | | |
|---|---|---|---|
| 1,547,197 | 7/1925 | Arbon | 166/370 |
| 4,593,760 | 6/1986 | Visser et al. | 166/267 |
| 4,605,069 | 8/1986 | McClaflin et al. | 166/370 X |
| 4,844,156 | 7/1989 | Hesh | 166/370 X |
| 4,934,458 | 6/1990 | Warburton et al. | 166/370 |
| 5,050,676 | 9/1991 | Hess et al. | 166/370 X |
| 5,095,975 | 3/1992 | Bernhardt | 166/370 X |

Primary Examiner—Stephen J. Novosad
Attorney, Agent, or Firm—Stoel Rives Boley Jones & Grey

[57] ABSTRACT

Methods and systems for recovering groundwater, gases and vapors from subsurface locations in a single, integrated operation by applying a vacuum to groundwater recovery wells are disclosed. Selective recovery of specific contaminants from zones of interest containing high levels of those contaminants is achieved by manipulating the local water table level. Groundwater recovery systems may also utilize eductor systems having venturi nozzles that create a vacuum networked. A plurality of such recovery wells operated using eductor systems may be operated by a single pump at or above grade level. In this fashion, a network of recovery wells may be operated using a single pump and control system. The recovery methods and systems of the present invention are preferably utilized in association with known contaminant removal systems to provide complete removal of contaminants and improved remediation efficiencies.

20 Claims, 5 Drawing Sheets

METHODS AND SYSTEMS FOR RECOVERING SUBSURFACE MATERIALS

TECHNICAL FIELD

The present invention relates to methods and systems for recovering groundwater, gases and vapors from subsurface zones. The methods and systems of the present invention are especially suitable for recovering volatile and semi-volatile constituents from subsurface groundwater, gases and vapors.

BACKGROUND OF THE INVENTION

Contamination of subsurface materials with hazardous compounds as a result of spills, leakage, surface discharges, and the like is a serious and pervasive problem. Liquid and liquid-borne contaminants seep into subsurface soils and/or rock formations and may ultimately percolate downwardly to contaminate the groundwater. Contaminated groundwater is typically recovered from specialized groundwater recovery wells, while vapors and gases are recovered from independent vapor recovery wells. Cleanup of contaminated subsurface materials and groundwater involves extensive treatment, frequently requiring long treatment periods and substantial resources.

Removal of contaminated groundwater from groundwater recovery wells using of one or more pumps is a known technique. A pump is typically submersed in the well and operated to withdraw water from the well until all of the groundwater that seeps into the well has been withdrawn. The contaminated groundwater may then be treated for removal of contaminants using any of a variety of known techniques.

Conventional groundwater recovery systems typically utilize devices such as float switches. In these systems, if the groundwater level increases above or decreases below a certain level, the float switch is tripped. In this fashion, the groundwater level is monitored on at least an intermittent basis. These systems do not, however, provide continuous, accurate information as to the groundwater level within the well. Moreover, they do not provide any mechanism for preferentially recovering groundwater from selected levels within the recovery well.

Recovery rates and efficiencies for groundwater recovery wells vary depending upon placement, subsurface conditions, and the like. The shape of the radius of influence for a particular well is dependent on a number of factors, including the pumping rate and duration, the hydraulic gradient, and the characteristics of the aquifer. Discharge from a pumped well is initially derived from storage within the wellbore and the aquifer immediately surrounding the well. As pumping continues, the radius of influence expands and more water is removed from storage within the aquifer at greater distances from the well.

Parabolic capture zones can also be characterized for each pumped well. Substantially all groundwater within the capture zone of a pumped well is ultimately recovered from the well if the pumping duration is long enough. Groundwater and associated contaminants located outside the capture zone are not recovered. Migration of groundwater located outside the capture zone but within the radius of influence of a pumped well is impeded, but that groundwater will generally not be captured by the pumped well. The overlap between the radius of influence and the capture zone of a single pumped well or a plurality of pumped wells creates local changes in the water table around the pumped well(s) over time, which can be illustrated using water table contour maps.

The downgradient area influenced by the capture zone of a pumped well is generally much smaller than the upgradient reach. The size of the capture zone, unlike the radius of influence, does not change over time. Consequently, the effectiveness of the groundwater recovery component of remediation programs depends, at least in part, upon proper placement of the recovery well(s).

Recovery and treatment of groundwater alone rarely provides a satisfactory level of contaminant removal, since significant subsurface contamination is present in gaseous and vaporous forms. This is particularly true of contaminants such as volatile organic components (VOCs) and semi-volatile organic components (semi-VOCs) that have relatively high vapor pressures and relatively low solubilities in water. VOC contaminants include, for example, methylene chloride, 1,1-dichloroethylene, 1,1-dichloroethane, trans-1,2-dichloroethylene, 1,2-dichloroethane, 1,1,1-trichloroethane, 1,2-dichloropropane, trichloroethylene, tetrachloroethylene, benzene, ethylbenzene, toluene, xylenes, and the like. Typically, separate vapor recovery wells are drilled and gases/vapors are withdrawn from separate vapor recovery wells using different recovery techniques.

Methods for removing contaminants from soils and other subsurface materials may require excavation and removal of contaminated materials from the site. Another technique involves leaching of contaminants from subsurface materials by percolating water through the contaminated soil. The contaminated percolated water is then withdrawn after it has reached the water table. Existing methods typically require long treatment periods and substantial expense, and they are not generally effective to remove contaminants having a low water solubility.

U.S. Pat. No. 4,593,760 discloses recovery techniques for removing volatile contaminants from the vadose zone between the surface of the earth and the undergroundwater table. According to the teachings of the '760 patent, the vapor recovery well comprises a lower perforated portion that permits fluid flow from the surrounding subsurface material and an upper impervious portion that inhibits leakage of air from the surface of the ground. When a vacuum is applied, vapor contaminants in the vadose zone are drawn through the perforated well casing. Once contaminants have entered the well, they are removed for treatment by means of fan, blower, vacuum pump, or the like. The well is constructed so that fluids in the vadose zone flow into the well, but liquid in the saturated zone below the water table cannot substantially flow into the well. Moreover, the vacuum applied is insufficient to draw a significant amount of water from the saturated zone into the wellbore conduit.

Eductor systems for extracting water from wells have been used in drinking water well applications. Eductor systems extract water from a well by pumping water through a constricting orifice and then through an expansion nozzle to create a vacuum. Individual pumps are typically provided for each individual well, and the volume of water extracted is modulated by alternately activating and deactivating the pump/eductor system. The inventor is not aware of previous uses of eductor systems in contaminated groundwater recovery systems.

SUMMARY OF THE INVENTION

The present invention provides methods and systems for recovering liquids such as groundwater, gases and vapors from subsurface locations in a single, integrated operation. A vacuum is applied to groundwater recovery wells to achieve coextraction of groundwater and other liquids with gases and vapors from the subsurface materials surrounding the well. Substantial contaminant removal may be achieved from subsurface sites as a consequence of enhanced volumetric groundwater recovery with application of vacuum. Moreover, residual volatile and semi-volatile materials that have low solubilities in water are removed from subsurface soils and/or rock formations in the integrated operation after the contaminated groundwater has been removed. These methods and systems may be utilized in association with liquid and gas purification systems to provide enhanced overall removal of contaminants from subsurface zones and realize improved remediation efficiencies.

Especially preferred methods of the present invention may be used first to identify zones of interest that contain higher levels of a selected contaminant than other subsurface areas, and then to selectively recover contaminated materials from specific zones of interest. A level sensor is preferably employed to continuously monitor the level of the water table at the well. This information may be used by an operator or a programmable control system to manipulate the level of the local water table, and thereby preferentially withdraw contaminated soil gas and vapors from specific zones of interest.

Additionally, recovery systems of the present invention may be utilized in conjunction with an eductor system that utilizes venturi nozzles to create a vacuum. Standard groundwater recovery systems utilize an individual pump for each recovery well. Using eductor systems according to the present invention, a network of wells may be operated using a single pump. The pump is controlled to operate individual wells by means of electronic valves. A control unit interfaces with the valve/pump arrangement to control the sequence of valve manipulations, thereby controlling the rate of groundwater recovery from each recovery well. This system can also be coordinated and controlled to preferentially withdraw contaminants from identified zones of interest for a plurality of recovery wells.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DESCRIPTION OF PREFERRED EMBODIMENTS

While the following description is presented in terms of groundwater, soil gas and vapor recovery as a prelude to removal of VOC and semi-VOC contaminants, a practitioner in the art would recognize that methods and systems of the present invention may be used to recover a variety of materials from subsurface locations for a variety of purposes. Such materials need not be contaminants, but may comprise beneficial constituents that can be withdrawn in accordance with the methods and systems disclosed herein. Illustrative preferred embodiments of the invention are described below with reference to containment removal and are not intended to limit the scope of the invention in any fashion.

The present invention provides recovery methods and systems for extracting groundwater and other liquids, gases and vapors from a recovery well in an integrated operation. Zones of particular interest, such as zones having high contaminant concentrations, can be located and contaminants from those zones of interest can then be selectively and preferentially withdrawn. Recovery of groundwater, gases and vapors using the methods and systems described herein has proven effective in recovery environments as diverse as shallow, unconsolidated soils and bedrock.

Figure 1:
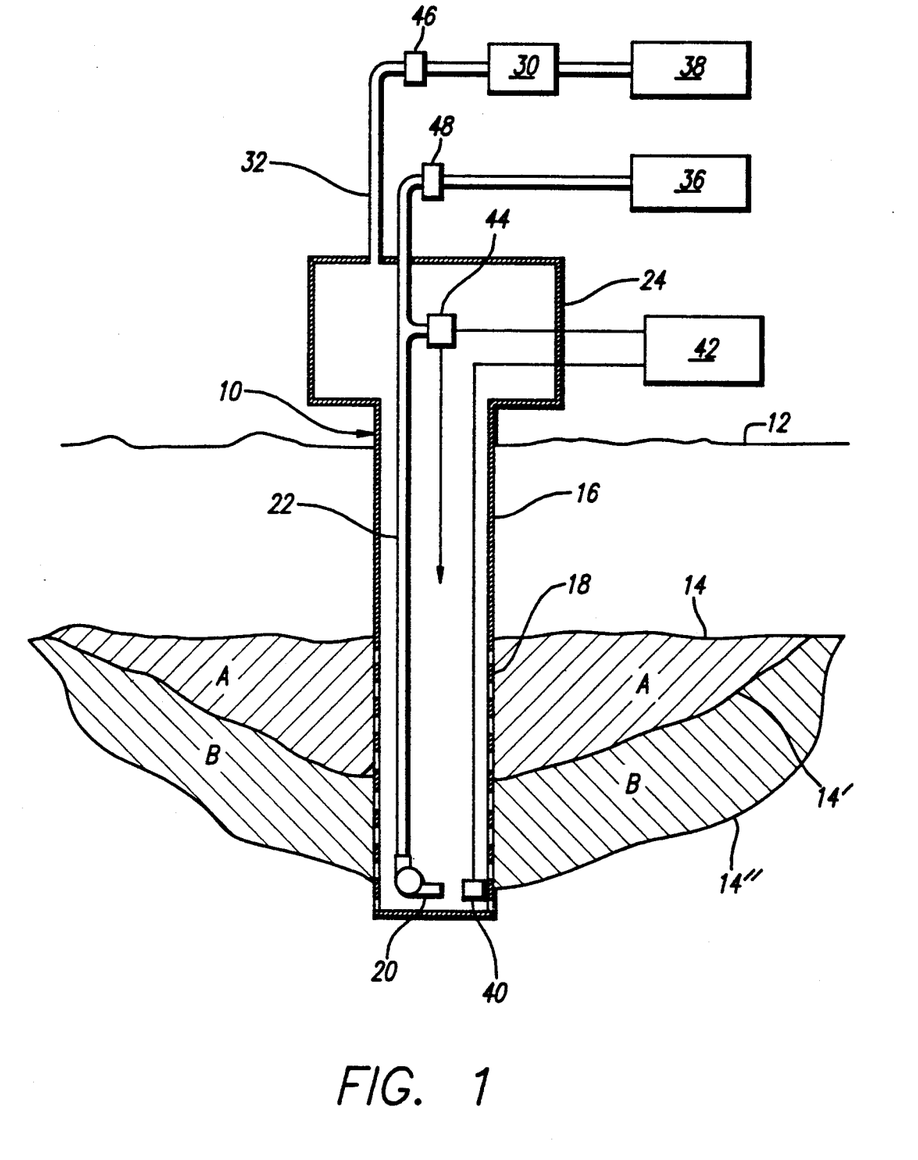
FIG. 1 is a schematic representation of a vacuum-enhanced recovery unit of the present invention including a water table level control system installed at a groundwater recovery well.

FIG. 1 illustrates a conventional groundwater recovery well operated using a submersible pump according to the methods and systems of the present invention. Recovery well 10 may be of standard construction, and recovery well 10 is sufficiently deep to penetrate the top of a saturated zone. As shown in FIG. 1, line 12 represents the grade surface, and line 14 represents the initial static water level. The degree of penetration of recovery well 10 into the saturated zone below the static water level depends principally upon the site geology. For most applications, the recovery well extends substantially below the initial static water level, and substantially into the saturated zone. Recovery well 10 preferably has a relatively large diameter of about 4 to about 30 inches, with intermediate diameters of about 12 to 14 inches being especially preferred. The precise construction and dimensions of recovery well 10 will, of course, depend upon the nature of the site, subsurface conditions, the contaminants or other materials targeted for recovery, and the like.

Well casing 16 extends for substantially the depth of the recovery wellbore hole. The lower portion of well casing 16 is preferably constructed from a liquid permeable material, such as slotted screen 18. Slotted screen 18 typically extends from the bottom of recovery well 10 at least to the initial static water level, and preferably to slightly above the initial static water level. Various filtration materials may be provided at various zones within the well, as is known in the art. Silica sand may be used as a filter at deeper recovery zones, while fine silica gravel may be employed in upper sections of the well. An annular seal comprising a nonpermeable material such as bentonite pellets overlaid with a bentonite/cement grout is preferably provided to just below the grade surface. Well casing 16 preferably extends slightly above the grade surface. Suitable construction techniques for groundwater and vapor recovery wells are well known in the art.

Known sampling techniques may be used to determine desirable locations for recovery well 10. Groundwater levels at sampling locations and proposed recovery well locations can be used to provide a water table contour map for the site. Using a water table contour map, the radius of influence and capture zones may be estimated for various recovery well locations. Recovery well locations may therefore be selected so that the capture zones encompass the largest contaminant deposits. Locating recovery wells near the leading edge of VOC contaminant concentrations is generally most effective for capturing VOC contaminants.

As shown in FIG. 1, submersible pump 20 is located near the bottom of recovery well 10 and is operatively connected to groundwater withdrawal conduit 22 for withdrawing pumped liquids from recovery well 10. Liquid withdrawal means other than submersible pumps are known in the art and may be used in connection with the methods and systems of the present invention. Enlarged vacuum drum 24 is mounted on well casing 16 above grade surface 12. Vacuum drum 24 is preferably generally cylindrical, has a diameter larger than that of recovery well casing 16, and is constructed from an impermeable, substantially rigid material. Vacuum drum 24 is sealed to well casing 16 so that a vacuum can be generated within the drum and well casing 16.

Vacuum inducer 30 is in communication with recovery well 10 by means of vacuum conduit 32 mounted through vacuum drum 24. Vacuum inducer 30 is capable of creating a vacuum within vacuum drum 24 and recovery well 10 sufficient to draw groundwater, gases and vapors from subsurface areas surrounding recovery well 10 into well casing 16. Liquids are then withdrawn through liquid withdrawal conduit 22, and gases and vapors are withdrawn through vacuum conduit 32. Vacuum inducer 30 may be operated in tandem with or independently from pump 20 during operation of the recovery system.

Vacuum inducer 30 is preferably capable of providing an adjustable vacuum of about 4 to about 12 inches Hg at the recovery well. This vacuum level is generally sufficient to provide enhanced recovery of groundwater, gases and vapors from recovery wells. Various subsurface conditions and substrates may, of course, require application of various vacuum levels. The variable vacuum may be manipulated, for example, to achieve optimum subsurface gas movement, enhanced groundwater recovery, and the like.

A variety of vacuum sources, such as centrifugal fans, blowers, vacuum pumps, and the like may be adapted for use in the methods and systems of the present invention. Positive displacement blowers are especially preferred vacuum inducers, particularly when the soil conditions are less permeable, because positive displacement blowers generate suitable vacuums regardless of the soil conditions. Suitable positive displacement blowers are well known and are commercially available. A preferred positive displacement blower is a rotary lobe-type blower sold as Model 615 U-RAI, manufactured by Roots Blower, Connersville, Ind.

Groundwater extracted through groundwater withdrawal conduit 22 is preferably conveyed to water treatment apparatus 36 for processing to remove contaminants. Likewise, gases and vapors extracted through vacuum conduit 22 are preferably conveyed for treatment in treatment system 38. Treatment techniques for removing VOCs and semi-VOCs from liquids and gases are known in the art.

Vacuum-enhanced groundwater recovery techniques provide several important benefits. During a contaminant recovery operation, areas closest to recovery well 10 (i.e., the wellbore and the aquifer in the vicinity of the wellbore) first exhibit a reduction in the water table level. Continued application of vacuum results in a reduction in the groundwater level at capture zone locations further from recovery well 10. Experimental results suggest that vacuum-enhanced groundwater recovery techniques of the present invention result in an enhanced volumetric groundwater recovery of up to about 30%. Enhanced volumetric groundwater recovery enlarges the zone of influence and provides enhanced recovery of contaminated groundwater from subsurface locations further from the recovery well. These techniques may therefore be used to facilitate recovery of contaminated groundwater from subsurface locations that are not otherwise accessible to recovery efforts.

Moreover, vacuum-enhanced groundwater recovery techniques provide enhanced overall contaminant recovery because gases and vapors containing contaminants are co-extracted with groundwater. As the groundwater level in subsurface locations is lowered, soil that was previously in the saturated zone is no longer submerged. Continuing vacuum application to recovery well 10 therefore results in the extraction of gases and vapors from subsurface regions that were previously saturated with water, and thereby provides substantially complete recovery of volatilized as well as solubilized contaminants in an integrated operation.

Another aspect of the present invention involves the identification and isolation of zones of interest containing particularly high levels of contaminants. Contaminants are not typically distributed uniformly in subsurface locations. VOCs, for example, are typically concentrated at particular subsurface depths. Conventional sampling and testing techniques may be used to identify zones of interest containing high levels of contaminants both prior to and during recovery. Preferred techniques include continuous monitoring of contaminant levels during operation of the recovery wells to monitor and identify zones of interest.

Selective recovery of subsurface materials from zones of interest is achieved by continuously monitoring and manipulating, if necessary, the subsurface water table level. Using groundwater level monitoring and control devices, groundwater levels can be arrested and maintained at various levels to facilitate substantially complete removal of contaminated gases and vapors from identified zones of interest. The water table level may be depressed, for example, to a level just below the zone of interest to enhance recovery of gases and vapors from the zone of interest. In the case of certain contaminants that exhibit high concentrations at identifiable levels, such as VOCs and semi-VOCs, it may be unnecessary to pump the well dry, provided that contaminant recovery from the zones of interest is substantially complete.

Groundwater level monitoring and control systems of the present invention utilize a level sensor 40 located in recovery well 10 capable of measuring the groundwater level in well 10. Level sensor 40 may, for example, comprise a liquid-tight pressure transducer placed at the bottom of the recovery well capable of measuring the height of the water above the transducer. The pressure exerted on a flexible diaphragm in the pressure transducer is directly proportional to the height of the water above the transducer, and the transducer converts the pressure to an electrical signal indicative of the groundwater level. Suitable liquid-tight pressure transducers are known in the art and are commercially available. Level probes that operate using principles of conductance may also be employed. As a result of the required length of the probe, level probes are most suitably employed in shallow recovery wells. One or more float switches may alternatively be employed to provide specific water level data points.

Level sensor 40 preferably communicates groundwater level information to a system control unit 42. System control unit 42 is preferably interactive and permits entry of information, for example, as to the location of certain zones of interest. A preferred control unit 42 for use in the practice of the present invention is a Program Logic Controller (PLC) 500 Series Model, manufactured by Texas Instruments and driven by Richardson, Tx, Ti-Way or Ti-Soft commercial software available from Texas Instruments. Programming of such a controller as outlined above to achieve the system objectives can be accomplished in a variety of ways.

When the water table has reached a level at or just below an identified zone of interest, pump 20 may be inactivated to maintain the water table at a constant level. Alternatively, pump 20 may be operated continuously and a level control valve 44 may be activated to return pumped water or liquid from another source to the wellbore to maintain the water table at a constant level. The water table level may thus be lowered or raised incrementally in a controlled fashion to provide substantially complete recovery of contaminants from all zones of interest.

Operation of a vacuum-enhanced groundwater recovery well will be described with reference to the schematic drawing of FIG. 1. The static groundwater level at the recovery site prior to commencement of recovery operations is illustrated at 14. After operation of submersible pump 20 for a first interval, the water table level has migrated to a level indicated by reference numeral 14'. The water table level may then be maintained at level 14' to selectively remove gases and vapors present in zone of interest A above water table level 14'. When contaminant recovery from zone of interest A is complete, the water table level may be further reduced to level 14" by withdrawal of additional volumes of groundwater. Gases and vapors present in zone of interest B may then be selectively withdrawn if the water table level is maintained at level 14". Further reductions in the water table level result in removal of additional volumes of groundwater and permit selective recovery of various contaminants from additional zones of interest that are exposed as the groundwater level is reduced.

Control unit 42 is designed and configured to selectively operate one (or more) vacuum inducers 30, each operably connected to a recovery well 10 in a contaminant recovery system, on the basis of information received from level sensors 40 and commands entered by a recovery system operator. Operation of a plurality of groundwater recovery wells may thus be controlled by a central control unit 42. System control unit 42 receives signals from level sensor(s) 40 and compares those actual water level signals to one or more set points. Appropriate set points may be determined based upon preliminary or continuing contaminant analysis. Control unit 42 activates and deactivates pump 20 or level control valve 44 based upon the comparison between the actual water level and the set point. Sample ports 46 and 48 are preferably provided in liquid and vacuum recovery conduits 22 and 32, respectively, for sampling liquids and gases withdrawn from the recovery well. The operator and/or the control unit analyzes the sampling data and other relevant information to determine desired water table levels and set points for selectively recovering contaminants from identified zones of interest at each recovery well 10. Alternatively, recovery wells can, of course, be operated manually using information as to identified zones of interest and water table levels to control the groundwater level in each well.

Level control valve 44 useful in the practice of the present invention may be of any construction capable of recycling a portion of a liquid process stream or introducing a liquid stream from another source. Level control valve 44 preferably interfaces with and is controlled by control unit 42. Sample ports 46 and 48 likewise may be of standard construction, and well-known sampling techniques may be used to measure contaminant levels of various materials in liquid and gaseous samples.

Figure 5:
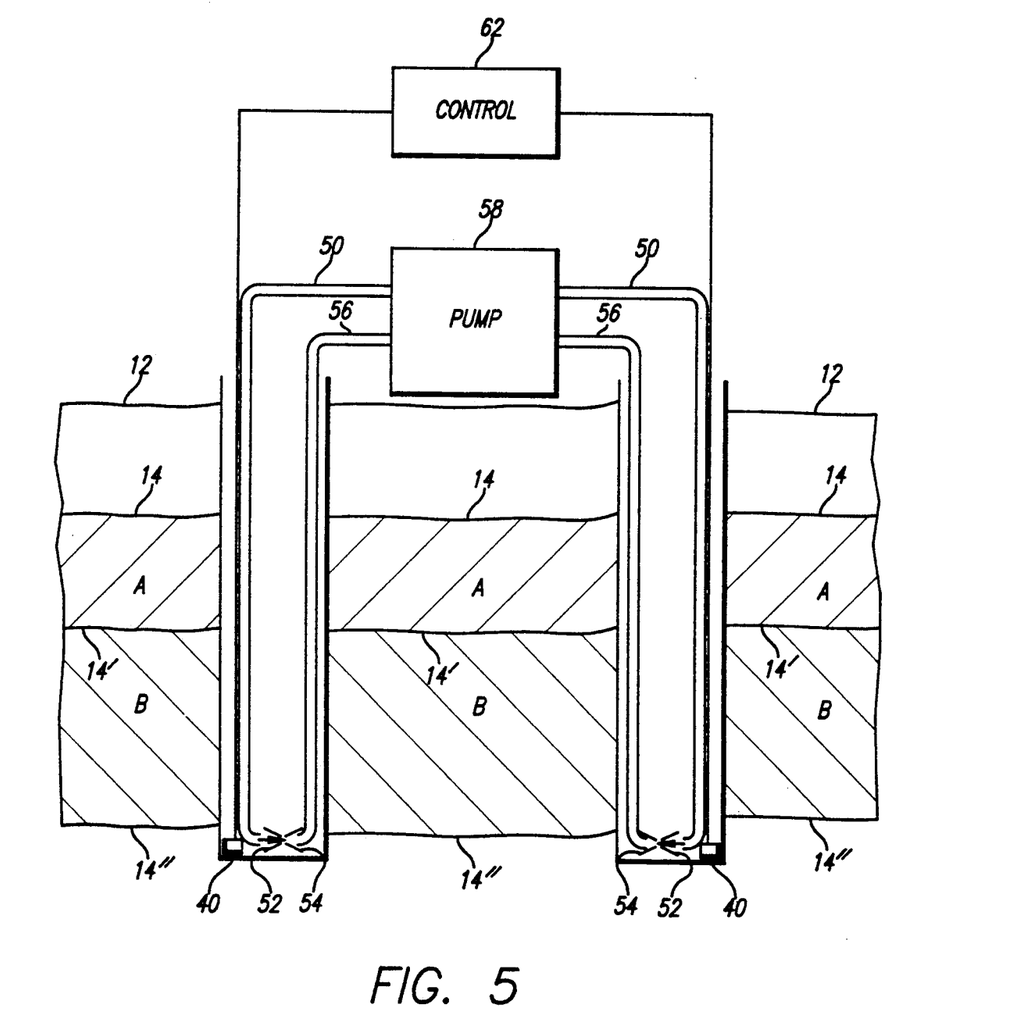

According to another aspect of the methods and systems of the present invention, eductor systems may be used in the place of submersible pumps to remove liquids from groundwater recovery wells as illustrated in FIG. 5. Eductor systems include a fluid delivery conduit 50, a constricting orifice 52, an expansion nozzle 54, and a fluid withdrawal conduit 56. An eductor system operates by pumping water through a constricting orifice and then through an expansion nozzle to create a vacuum. Eductor systems are much less prone to mechanical failure than are submersible pumps, and they provide reliable operation at capacity levels suitable for use with recovery wells as described herein.

Standard groundwater recovery systems require a separate pump, typically a submersible pump, for operation of each recovery well. Substituting eductor systems for submersible pumps to withdraw groundwater from recovery wells, the eductor systems of several recovery wells can be linked together and operated by means of a single pump mechanism 58, as shown in FIG. 5. Moreover, the pump mechanism operating one or more eductor systems may be installed at grade level to facilitate maintenance and control efforts.

Using a single pump to operate a plurality of eductor systems in a plurality of recovery wells may be accomplished in a variety of fashions. According to preferred embodiments, each recovery well is isolatable by means of controllable electronic valves. Operation of both the pump and the valves is preferably monitored and controlled by a system control unit 62. The volume of water extracted from each individual recovery well and, consequently, the water table level at that well may be controlled by the amount of time that each individual eductor system is operated. Water table levels at recovery wells utilizing eductor systems may be monitored and controlled as described above to selectively withdraw contaminants from identified zones of interest.

EXPERIMENTAL RESULTS

Groundwater Recovery from Bedrock Wells

Groundwater samples were collected from bedrock wells designated BR-1S, BR-1D, BR-3 and BR-5 and from a large diameter groundwater recovery well designated RW-7 for chemical characterization. The presence and concentration of VOCs, including 1,1,1,-trichloroethane (TCA), trichloroethylene (TCE), tetrachloroethylene, i.e., perchloroethylene (PCE) and methylene chloride (MeCl), were evaluated in groundwater samples taken from each well. Total VOC concentrations detected in bedrock wells BR-1S, BR-1D and BR-3 prior to initiation of the experimental processing were 196.0 mg/L, 2,186 mg/L and 1,604 mg/L, respectively.

Two VOCs (TCA and TCE) accounted for approximately 85% of the total VOC concentration detected. TCA was present at the following concentrations: 26.0 mg/L in well BR-5; 95.0 mg/L in well RW-7; 240.0 mg/L in well BR-1D; 0.97 mg/L in well BR-1S; and 190.0 mg/L in well BR-3. TCE was present at the following concentrations: 19.0 mg/L in well BR-5; 150.0 mg/L in well RW-7; 320.0 mg/L in well BR-1D; 0.67 mg/L in well BR-1S; and 150.0 mg/L in well BR-3. MeCl was not present at a concentration above the detection limit (5.0 mg/L) in wells BR-5 and RW-7. MeCl and PCE were not present at concentrations above the detection limit (0.5 mg/L) in well BR-1S. PCE was also not present in well BR-1D at a concentration above the detection limit (50.0 mg/L).

An experimental recovery well was constructed substantially as illustrated in FIG. 1. The well was initially operated without applying a vacuum to establish baseline groundwater volumetric flows and to establish that the system was operating satisfactorily. The well was then operated for an extended period of time applying a vacuum of about 4 inches Hg. This vacuum level represented the maximum vacuum level practically achievable under the geological conditions at the site. Application of the vacuum resulted in an increase of about 30% in the volumetric flow of water withdrawn from the well, compared to operation of the well without applying a vacuum. This observation suggests that application of the vacuum expanded the zone of influence of the recovery well.

Groundwater quality data collected from the bedrock wells 18 months after the commencement of the experimentation indicated that total VOC concentration in the upper bedrock aquifer had decreased as a result of vacuum-enhanced groundwater recovery techniques. VOCs, including TCA, TCE, PCE and MeCl, were detected in the final experimental groundwater samples at total concentrations ranging from 1.64 mg/L in well BR-1S to 670.0 mg/L in well BR-1D. The total VOC concentration in well BR-3 was 441 mg/L following the experiment. Well BR-1S therefore experienced a 99.2% overall VOC concentration reduction, while wells BR-1D and BR-3 experienced reductions of 69.4% and 72.5%, respectively. MeCl exhibited the greatest concentration reduction for a specific compound, followed by TCA and TCE. MeCl concentration reductions of 98.5%, 91.5% and 90.5% were observed for wells BR-1S, BR-1D and BR-3, respectively. TCA concentrations were reduced by 98.5%, 45.5% and 55.8% for the above-identified wells, while TCE concentrations were reduced by 97.2%, 5.9% and 44.4%, respectively.

Vacuum-enhanced groundwater, gas and vapor recovery from these experimental recovery wells thus resulted in dramatic reductions in the overall levels of VOC contaminants, and in the level of each specific VOC contaminant. Vacuum-enhanced recovery also resulted in an increased volumetric flow of water withdrawn from the well. Enhanced volumetric flow may be expected to result in an enhanced overall water yield and thereby increase the zone of influence of the recovery well. Fewer vacuum enhanced recovery wells are therefore required to capture groundwater at a contaminated site, as compared to conventional recovery wells.

Figure 2:
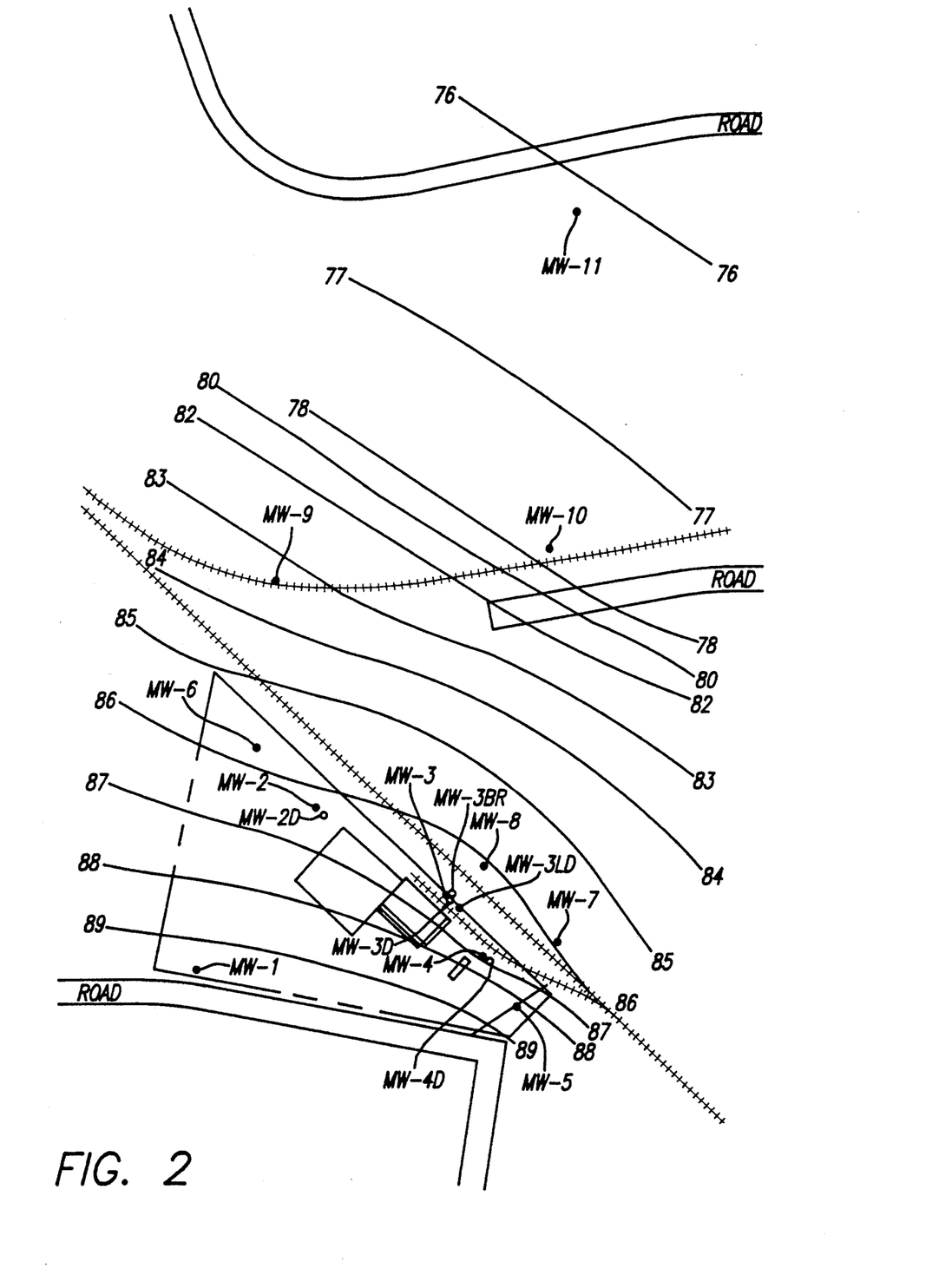
FIG. 2 is a water table contour map of groundwater conditions at an experimental clean-up site prior to start-up of a contaminant removal system in accordance with the present invention.

Modification of Water Table Levels and Contours Resulting from Vacuum-Enhanced Groundwater Recovery Techniques Another experimental vacuum-enhanced groundwater recovery system was established to study the effects of vacuum-enhanced groundwater recovery on water table levels and water table contours. The groundwater recovery system under test included wells designated as follows: deep monitoring wells MW-2D, MW-3D and MW-4D; bedrock well MW-3BR; monitoring wells MW-1 through MW-11; and large diameter pumping well MW-3LD. A water table elevation contour map was constructed using known sampling techniques. FIG. 2 illustrates the water table elevation contour map for the area surrounding the recovery zone and the location of the wells described above prior to initiation of the experimental recovery system. The contour lines show a slight inflection upgradient of the well caused by pumping of the recovery well. This indicates that although the well is intercepting water, it is not influencing downgradient contours. Well MW-3LD was operated in accordance with the vacuum-enhanced recovery techniques outlined in the description of preferred embodiments for an initial period of seventeen (17) days. Vacuum-enhanced recovery well MW-3LD was subsequently operated for several weeks after the initial seventeen-day period.

Figure 3:
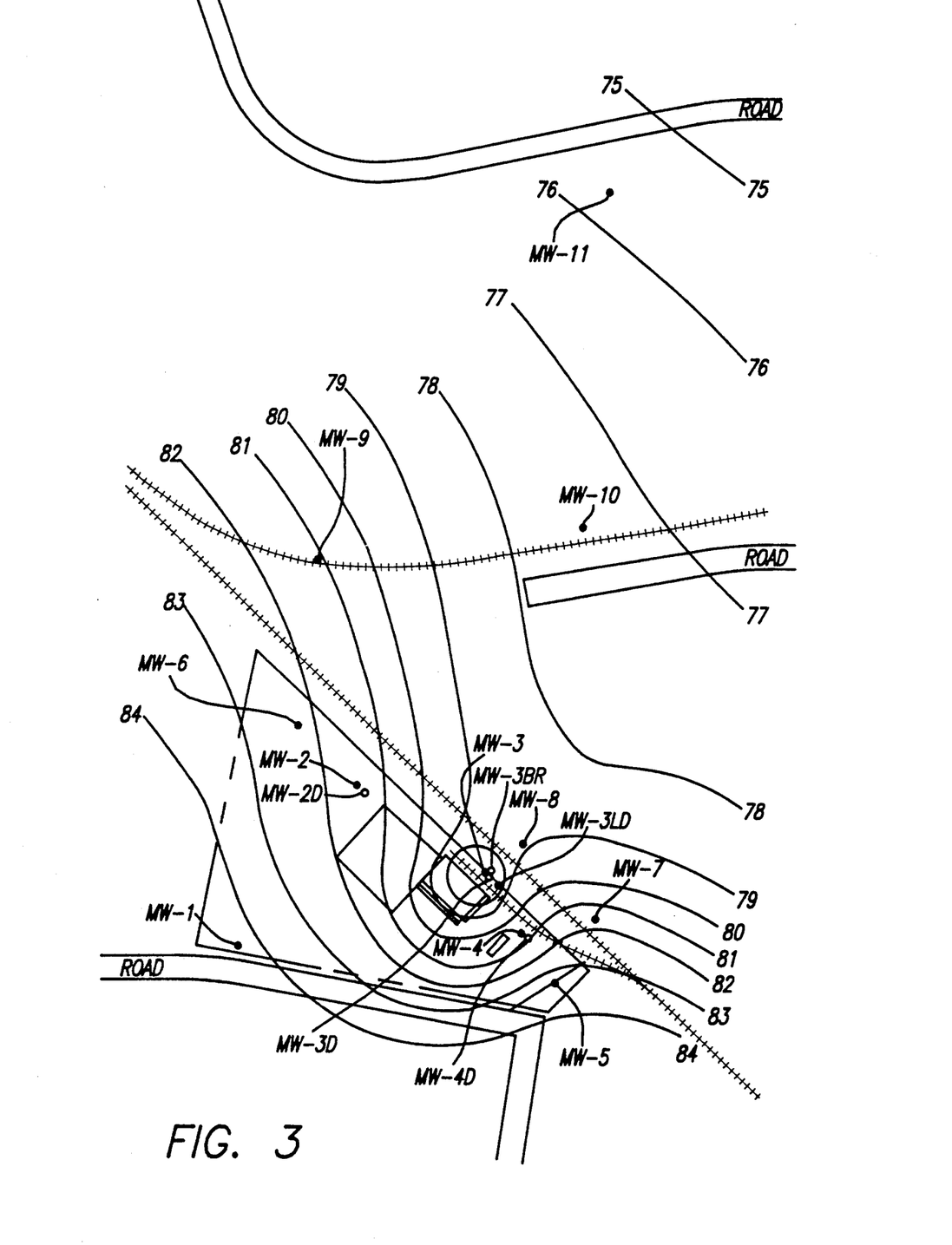
FIG. 3 is a water table contour map illustrating groundwater conditions at the site illustrated in FIG. 2 following 77 days of experimental operation of the contaminant recovery system.
Figure 4:
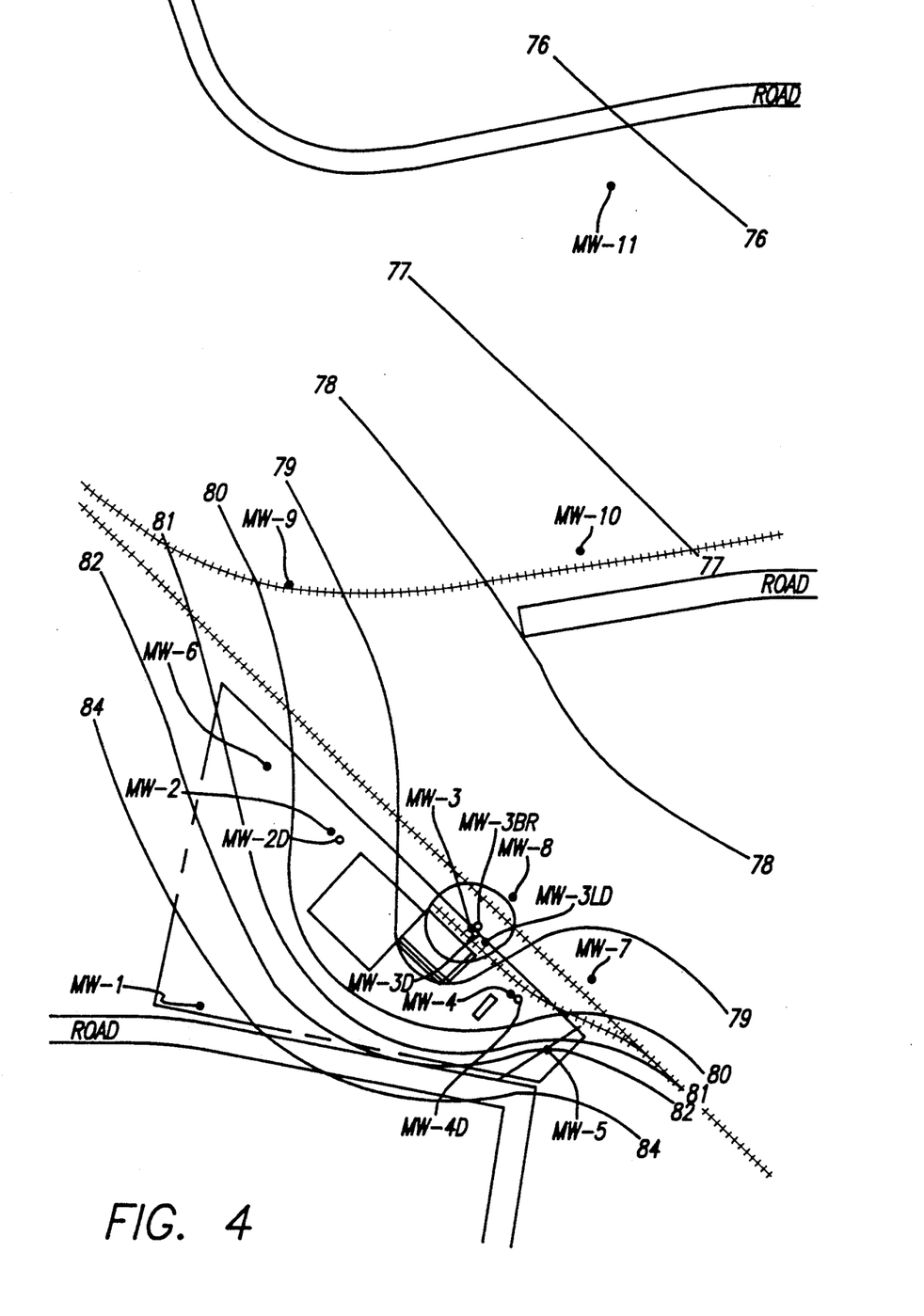
FIG. 4 is a water table contour map of groundwater conditions at the site illustrated in FIG. 2 following 77 days of experimental operation of the contaminant recovery system; and groundwater recovery wells, each employing an eductor unit, and operated by a common pump.

The water table elevation map for the site illustrated in FIG. 2 after operation of the vacuum-enhanced well MW-3LD for seventeen days is shown in FIG. 3. With the exception set forth below, depth-to-water measurements made in the shallow overburden monitoring wells were used to construct the water table contour map of FIG. 3. Data from wells MW-2 and MW-3 were not used to construct this contour map, because water table elevations for those wells were historically anonymously high and were therefore not considered representative of the site. A water table elevation contour map was also constructed after seventy-seven (77) days of operation of the experimental vacuum-enhanced groundwater recovery well. This contour map is illustrated in FIG. 4.

Vacuum-enhanced recovery resulted in higher volumetric water capture and an expanded capture zone. The water table elevation contour maps demonstrate the unexpectedly large and well defined zone of influence for well MW-3LD. The equipotential area surrounding well MW-3LD was well formed after 17 days of experimentation (compare FIGS. 2 and 3) and expanded notably during 60 days of subsequent testing (compare FIGS. 3 and 4). The contour maps constructed at the two time points after application of vacuum demonstrate that the upgradient inflection is substantially enhanced. Additionally, the contour maps illustrated in FIGS. 3 and 4 demonstrate a downgradient inflection that actually results in reversing the flow back to the recovery well. This experimental recovery well recovered contaminants from off-site locations as a consequence of the significant downgradient inflection and expanded capture zone.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A method for recovering a liquid from subsurface locations in proximity to a liquid recovery well that penetrates a saturated zone below an initial static liquid level, comprising:

withdrawing liquid from the recovery well by operation of a pump during liquid recovery periods, thereby changing the subsurface liquid level in proximity to the recovery well;

applying a vacuum to the recovery well during liquid recovery periods that is of sufficient magnitude to withdraw a higher volumetric flow of liquid from the recovery well than would be withdrawn using the pump along;

monitoring the subsurface liquid level in proximity to the recovery well during liquid recovery periods; and controlling the subsurface liquid level in proximity to the recovery well based upon the monitoring results.

2. A method according to claim 1, additionally comprising identifying a zone of interest within the saturated zone having a concentration of a material of interest greater than a predetermined concentration.

3. A method according to claim 2, additionally comprising locating the recovery well at a leading edge of the zone of interest.

4. A method according to claim 2, additionally comprising maintaining the subsurface liquid level in proximity to the recovery well below and generally adjacent the zone of interest.

5. A method according to claim 4, additionally comprising selectively withdrawing gases and vapors from subsurface locations within the zone of interest while the subsurface liquid level in proximity to the recovery well is maintained below and generally adjacent the zone of interest.

6. A method according to claim 1, additionally comprising monitoring the liquid level in a subsurface location in proximity to the recovery well substantially continuously during liquid recovery periods.

7. A method according to claim 1, additionally comprising maintaining the subsurface liquid level in locations in proximity to the recovery well at a desired level by inactivating the pump when the liquid level has reached the desired liquid level.

8. A method according to claim 1, additionally comprising maintaining the subsurface liquid level in proximity to the recovery well at a desired level during operation of the pump by returning a liquid to the well at substantially the same rate liquid is being withdrawn from the well after the desired liquid level is attained.

9. A method according to claim 1, additionally comprising withdrawing gases and vapors from subsurface locations above the subsurface liquid level by application of the vacuum.

10. A method according to claim 1, wherein the vacuum applied ranges from about 2 inches Hg to about 12 inches Hg.

11. A method for simultaneously recovery groundwater, gases and vapors from contaminated subsurface locations by means of a recovery well that penetrates a saturated zone below an initial static groundwater level, comprising:

operating a pump to withdraw a first volumetric flow of groundwater from the recovery well during groundwater recovery periods, thereby changing the water table level;

applying a vacuum to the recovery well during groundwater recovery periods, thereby withdrawing a second volumetric flow of groundwater from the recovery well greater than the first volumetric flow, and simultaneously withdrawing gases and vapors from contaminated subsurface locations above the water table level;

monitoring the water table level in proximity to the recovery well during ground water recovery periods; and controlling the water table level in proximity to the recovery well based upon the monitoring results.

12. A method according to claim 11, additionally comprising operating the pump during a groundwater recovery period until the water table level has reached a desired level; maintaining the water table level at the desired level; and applying the vacuum to the recovery well while the water table level is maintained at the desired level to preferentially withdraw gases and vapors from subsurface locations above the desired level.

13. A method according to claim 11, additionally comprising identifying a zone of interest within the saturated zone having a concentration of a material of interest greater than a predetermined concentration; and maintaining the water table level below and generally adjacent the zone of interest.

14. A method for preferentially withdrawing gases and vapors from an identified zone of interest in a subsurface location, comprising:

isolating the zone of interest by manipulating the subsurface water table level until it is generally below and in proximity to the zone of interest;

maintaining the subsurface water table level generally below and in proximity to the zone of interest; and applying a vacuum at subsurface locations in proximity to the zone of interest sufficient to withdraw gases and vapors from the zone of interest.

15. A method according to claim 14, additionally comprising locating the recovery well at a leading edge of the zone of interest.

16. A system for recovering contaminated materials from a subsurface location, comprising:

a groundwater recovery well that penetrates a saturated zone containing contaminated materials that is below an initial static water table level;

a pump capable of withdrawing groundwater from the recovery well during groundwater recovery periods, thereby changing the water table level in subsurface locations in proximity to the recovery well;

a water table level sensor capable of detecting the water table level in proximity to the recovery well; and a vacuum inducer capable of applying a vacuum to the recovery well during groundwater recovery periods, thereby providing withdrawal of a higher volumetric flow of groundwater from the recovery well than would be withdrawn using the pump means alone.

17. A system according to claim 16, additionally comprising:

a system control unit capable of controlling the pump and the vacuum inducer to change the water table level in response to input provided by the water table level sensor.

18. A system for recovering contaminated groundwater from a subsurface location comprising:

a recovery well penetrating a saturated zone below an initial static groundwater level;

an eductor system located in the recovery well utilizing a venturi nozzle to generate a vacuum; and a pump operably connected to the eductor system and capable of withdrawing groundwater from the recovery well.

19. A system according to claim 18, comprising a plurality of recovery wells, each recovery well having an eductor system, and a single pump operably connected to each of the plurality of eductor systems.

20. A system according to claim 19, additionally comprising one or more control isolating each recovery well and capable of initiating and ceasing withdrawal of groundwater from each recovery well.

* * * * *

UNITED STATES PATENT AND TRADEMARK OFFICE
CERTIFICATE OF CORRECTION

PATENT NO. : 5,271,467
DATED : December 21, 1993
INVENTOR(S) : R. Larry Lynch

It is certified that error appears in the above-identified patent and that said Letters Patent is hereby corrected as shown below:

Col. 4, line 1, replace "77" with --17--.

Col. 4, line 6, after "and" insert --Fig. 5 is a schematic representation of two--.

Col. 11, line 30, replace "along" with --alone--.

Col. 12, line 8, replace "recovery" with --recovering--.

Signed and Sealed this

Nineteenth Day of July, 1994

Attest:

BRUCE LEHMAN

Attesting Officer

Commissioner of Patents and Trademarks